(12) United States Patent
Cheng

(10) Patent No.: US 9,605,765 B1
(45) Date of Patent: Mar. 28, 2017

(54) ROTARY HYDRAULIC VALVE

(71) Applicant: Jui-Yuan Cheng, Caotun Township, Nantou County (TW)

(72) Inventor: Jui-Yuan Cheng, Caotun Township, Nantou County (TW)

( * ) Notice: Subject to any disclaimer, the term of this patent is extended or adjusted under 35 U.S.C. 154(b) by 0 days.

(21) Appl. No.: 15/011,680

(22) Filed: Feb. 1, 2016

(51) Int. Cl.
*F16K 11/076* (2006.01)
*F16K 11/085* (2006.01)

(52) U.S. Cl.
CPC ........ *F16K 11/076* (2013.01); *F16K 11/0856* (2013.01); *Y10T 137/86863* (2015.04); *Y10T 137/86871* (2015.04)

(58) Field of Classification Search
CPC ............... F16K 11/076; F16K 11/0856; Y10T 137/86863; Y10T 137/86871
See application file for complete search history.

(56) References Cited

U.S. PATENT DOCUMENTS

| | | | | |
|---|---|---|---|---|
| 2,806,485 A | * | 9/1957 | Collins | F15B 13/04 137/625.23 |
| 4,177,834 A | * | 12/1979 | Bonney | F16K 11/072 137/625.23 |
| 6,748,974 B1 | * | 6/2004 | McNulty | F16K 11/076 137/625.41 |
| 9,435,446 B1 | * | 9/2016 | Saunders | F16K 11/06 |
| 2004/0256422 A1 | * | 12/2004 | Penn | F16K 11/076 222/504 |
| 2013/0134341 A1 | * | 5/2013 | Cheng | F15B 13/0406 251/304 |
| 2016/0067896 A1 | * | 3/2016 | Yamaguchi | B29C 45/23 137/625.46 |

FOREIGN PATENT DOCUMENTS

TW DE 102011055902 A1 * 6/2013 .......... F15B 13/0406

* cited by examiner

*Primary Examiner* — Ryan Reis

(57) ABSTRACT

A rotary hydraulic valve contains a valve body in which an accommodation space is defined to accommodate a valve core having an axial post. The valve body includes an inlet, a first working orifice, a second working orifice, a first returning orifice, and a second returning orifice. The axial post has a first oil return portion, a second oil return portion, and an oil inflow portion. The first oil return portion has a first trench, the second oil return portion has a second trench formed, and the oil inflow portion has a peripheral groove. Between the oil inflow portion and the first oil return portion is defined a first work portion, and between the oil inflow portion and the second oil return portion is defined a second work portion. Furthermore, the valve core rotates to at least three angles relative to the valve body.

9 Claims, 10 Drawing Sheets

ROTARY HYDRAULIC VALVE

FIELD OF THE INVENTION

The present invention relates to a rotary hydraulic valve which controls and adjusts a flowing direction and flow of hydraulic oil.

BACKGROUND OF THE INVENTION

Conventional hydraulic system contains a hydraulic valve configured to adjust hydraulic pressure, flow and flowing direction of hydraulic oil so as to drive an actuator to operate, such as a lifting and a descending of a jack, a linear movement of a hydraulic cylinder, a rotation of a hydraulic motor, or a movement of an excavator. However, a valve block is provided to connect oil tubes so as to avoid leakage of the hydraulic oil and pressure loss in the hydraulic valve, thus causing high production cost and large size of the hydraulic valve.

To reduce the pressure loss, replacing another valve core of larger diameter is required, but the production cost increases accordingly.

The present invention has arisen to mitigate and/or obviate the afore-described disadvantages.

SUMMARY OF THE INVENTION

The primary objective of the present invention is to provide a rotary hydraulic valve in which a pressure of hydraulic oil acts in a valve body so that tightness between a valve core and the valve body is less than 3 um to reduce leakage of the hydraulic oil.

Further objective of the present invention is to provide a rotary hydraulic valve in which a pressure difference acting on the valve core is quite small so as to suspend the valve core in an accommodation space of the valve body smoothly.

Another objective of the present invention is to provide a rotary hydraulic valve which is lightweight, simplified and is controlled easily.

To obtain the above objectives, a rotary hydraulic valve provided by the present invention contains: a valve body in which an accommodation space is defined so as to accommodate a valve core having an axial post.

The valve body includes an inlet, a first working orifice, a second working orifice, a first returning orifice, and a second returning orifice which are all in communication with an external environment and the accommodation space.

The axial post of the valve core has a first oil return portion formed on a first end thereof and has a second oil return portion arranged on a second end thereof, the first oil return portion has a first trench defined thereon, and the second oil return portion has a second trench formed thereon; the axial post also has an oil inflow portion arranged on a middle section thereof, the oil inflow portion has a peripheral groove on which a first pressure balance orifice is formed.

Between the oil inflow portion and the first oil return portion is defined a first work portion, and between the oil inflow portion and the second oil return portion is defined a second work portion.

The first work portion has two adjacent first troughs formed on a first peripheral side thereof and facing the oil inflow portion, and the first work portion has two adjacent second troughs formed on a second peripheral side thereof and facing the oil inflow portion, wherein the two first troughs and the two second troughs communicate with the peripheral groove of the oil inflow portion.

The first work portion further has two opposite third troughs arranged between the first troughs and the two second troughs, such that the two third troughs face the first oil return portion and communicate with the first trench of the first oil return portion, and the first pressure balance orifice passes through the two third troughs so that the two third troughs communicate with each other through the first pressure balance orifice.

The second work portion has two adjacent first grooves formed on a first peripheral side thereof and facing the oil inflow portion, and the second work portion and has two adjacent second groves formed on a second peripheral side thereof and facing the oil inflow portion, wherein the two first grooves and the two second grooves communicate with the peripheral groove of the oil inflow portion.

The second work portion further has two opposite third grooves arranged between the first grooves and the two second grooves, such that the two third grooves face the second oil return portion and communicate with the second trench of the second oil return portion, and a second pressure balance orifice passes through the two third grooves so that the two third grooves communicate with each other via the second pressure balance orifice.

The valve core rotates to at least three angles relative to the valve body.

DETAILED DESCRIPTION OF THE PREFERRED EMBODIMENTS

Figure 1:
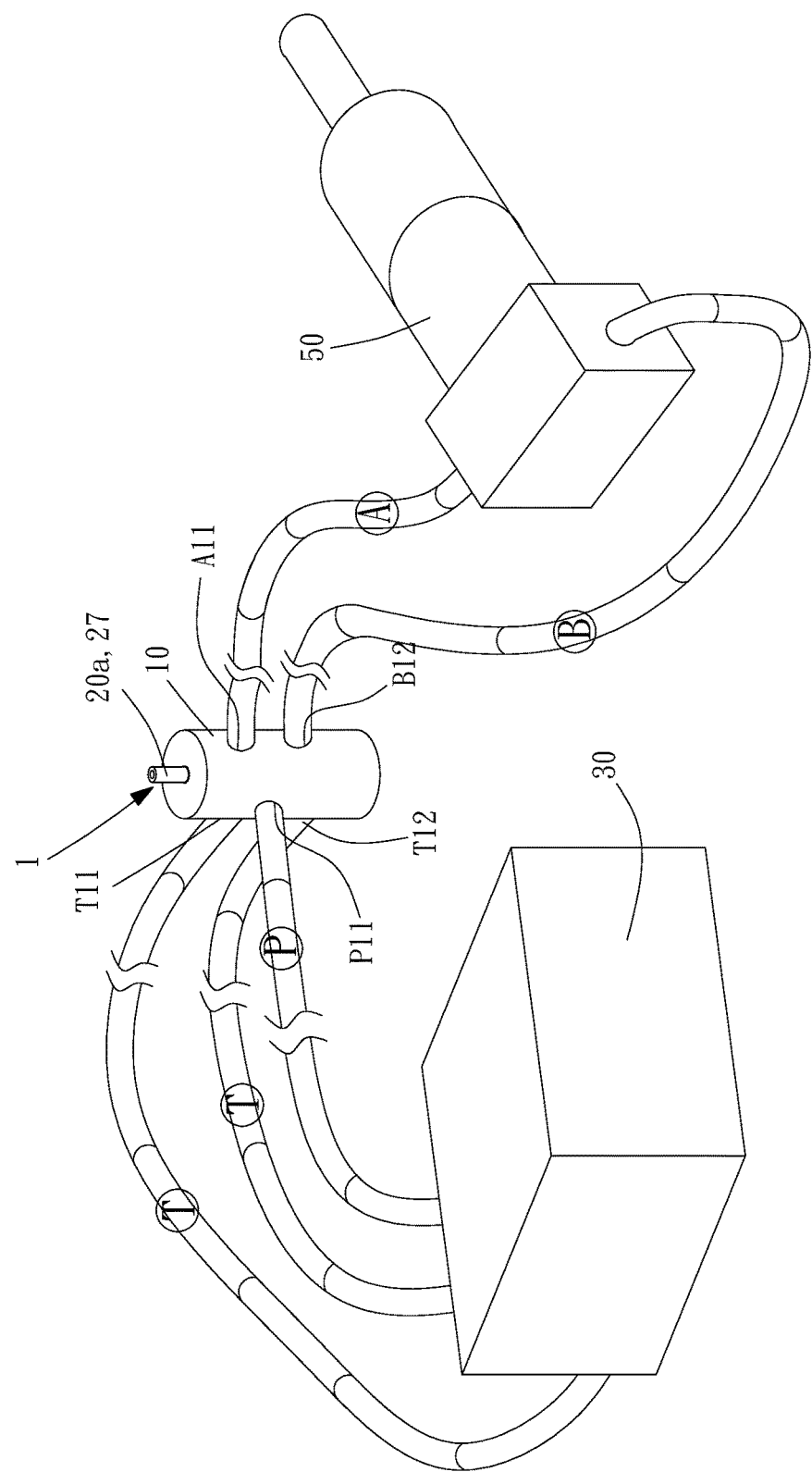
FIG. 1 is a perspective view showing the application of a rotary hydraulic valve according to a preferred embodiment of the present invention.
Figure 2:
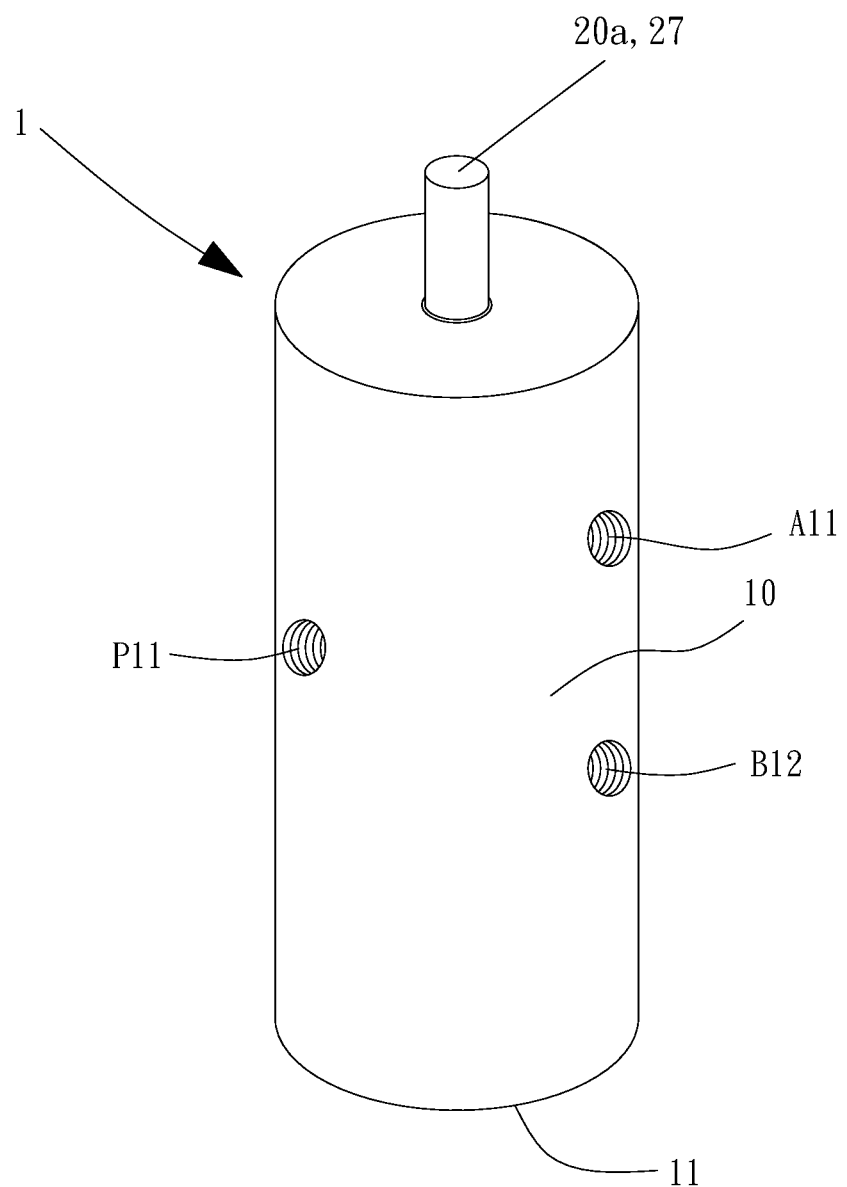
FIG. 2 is a perspective view showing the assembly of the rotary hydraulic valve according to the preferred embodiment of the present invention.
Figure 3:
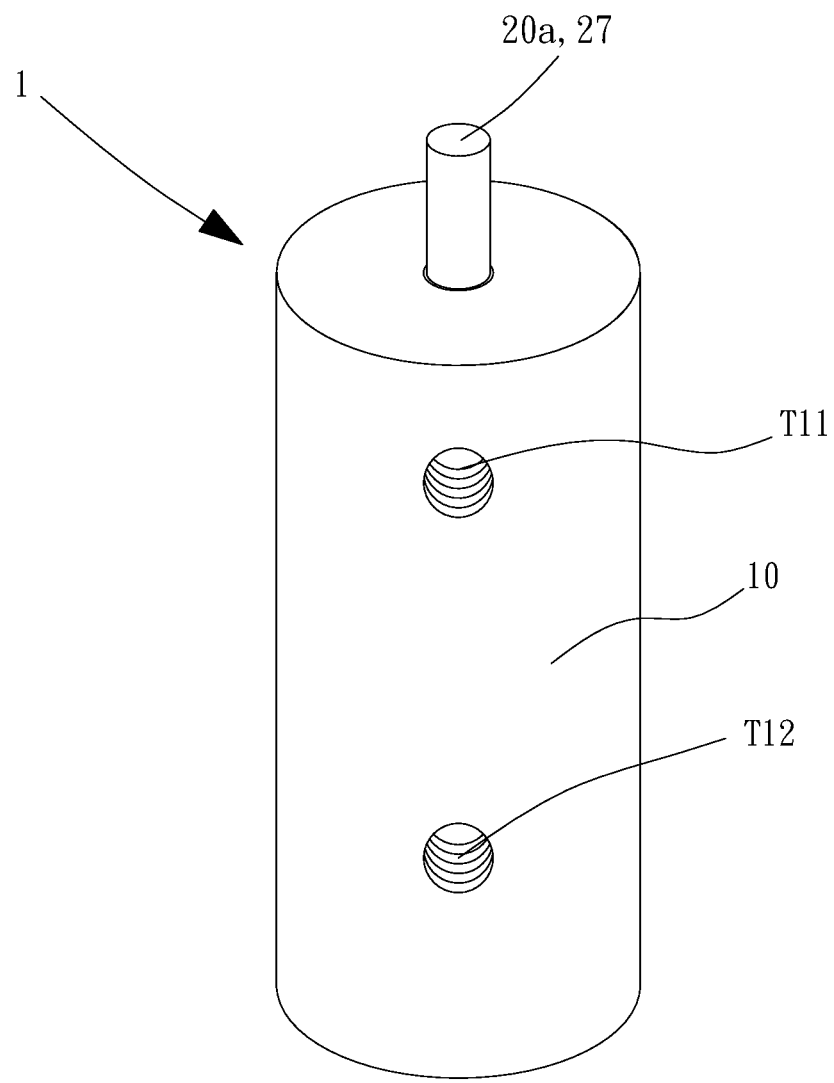
FIG. 3 is another perspective view showing the assembly of the rotary hydraulic valve according to the preferred embodiment of the present invention.
Figure 4:
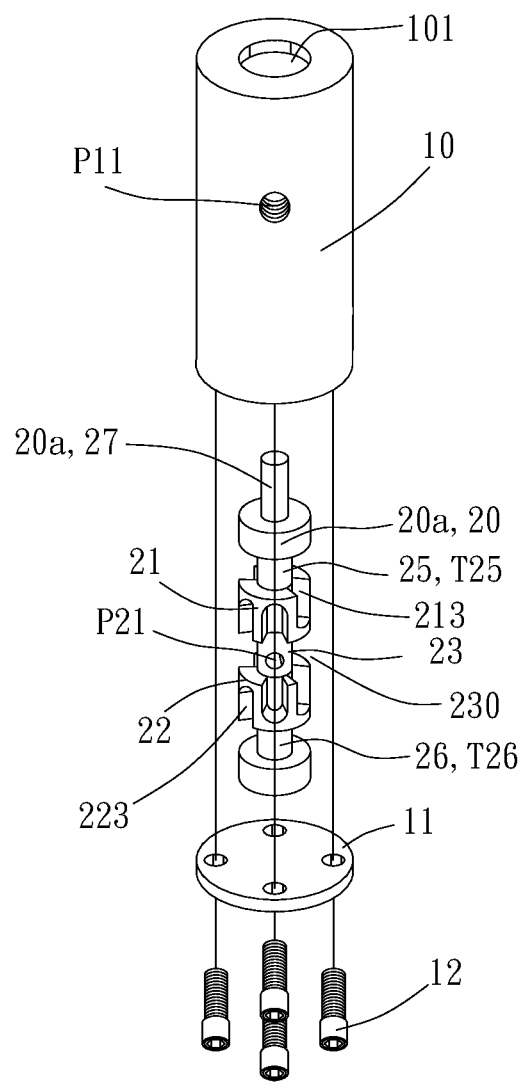
FIG. 4 is a perspective view showing the exploded components of the rotary hydraulic valve according to the preferred embodiment of the present invention.
Figure 5:
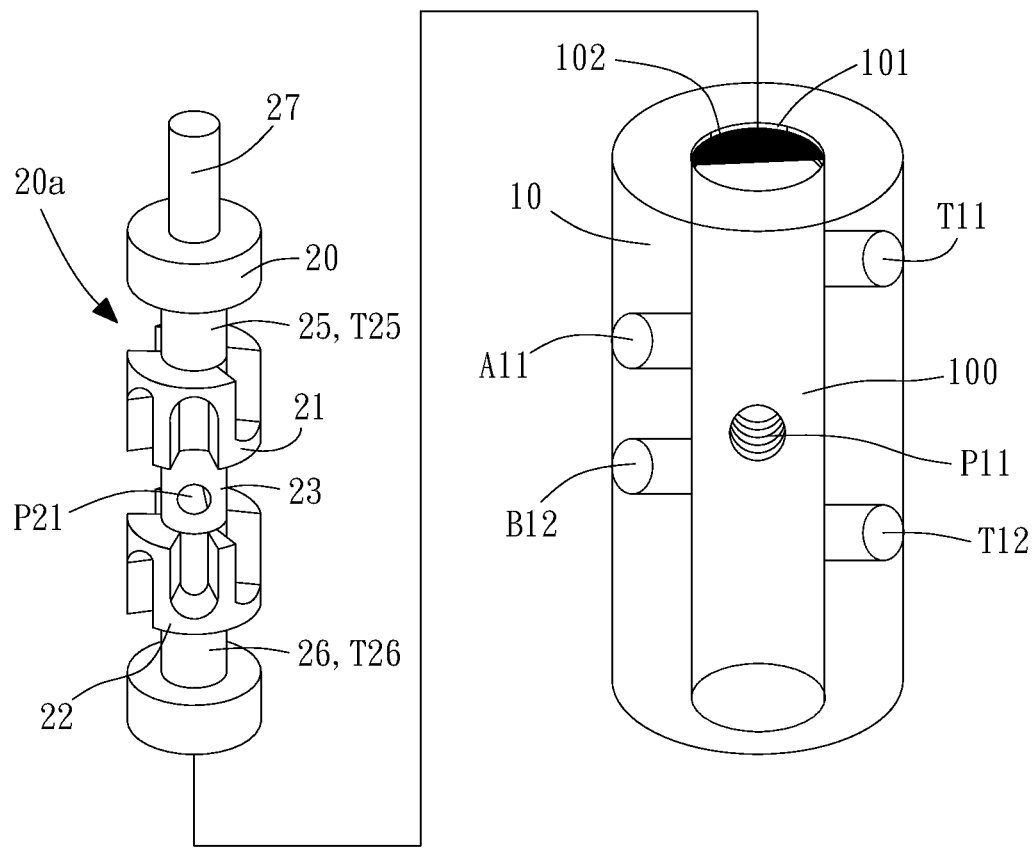
FIG. 5 is another perspective view showing the exploded components of the rotary hydraulic valve according to the preferred embodiment of the present invention.
Figure 6:
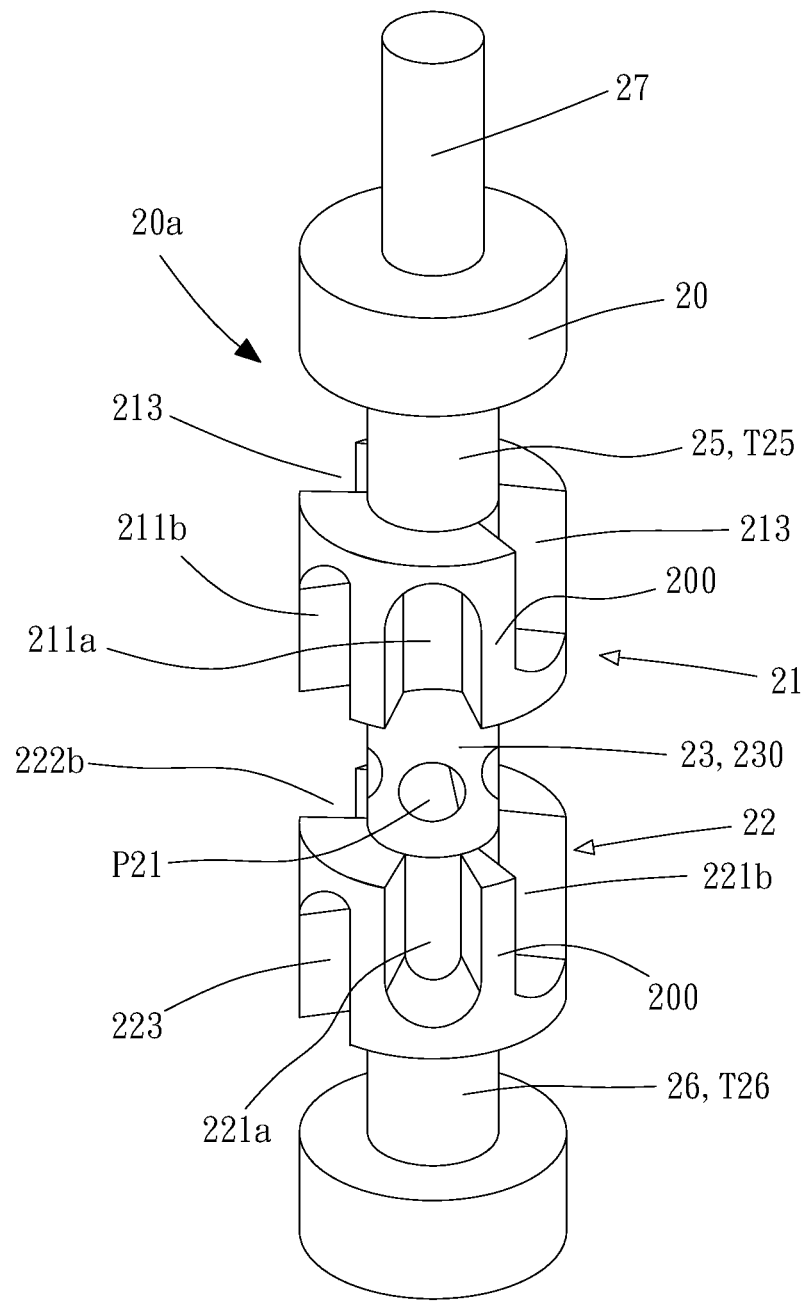
FIG. 6 is a perspective view showing the assembly of a valve core of the rotary hydraulic valve according to the preferred embodiment of the present invention.

With reference to FIGS. 1 to 7, a rotary hydraulic valve 1 according to a preferred embodiment of the present invention comprises: a valve body 10 in which an accommodation space 100 is defined so as to accommodate a valve core 20a having an axial post 20. The valve body 10 includes an inlet P11, a first working orifice A11, a second working orifice B12, a first returning orifice T11, and a second returning orifice T12 which are all in communication with an external environment and the accommodation space 100, wherein the inlet P11, the first returning orifice T11, and the second returning orifice T12 communicate with a hydraulic source 30. The first working orifice A11 and the second working orifice B12 connect with an actuator 50, such that the first working orifice A11 communicates with the second working orifice B12 via the actuator 50.

The axial post 20 of the valve core 20a has a first oil return portion 25 formed on a first end thereof and has a second oil return portion 26 arranged on a second end thereof, wherein the first oil return portion 25 has a first trench T25 defined thereon, the second oil return portion 26 has a second trench T26 formed thereon. The axial post 20 includes an oil inflow portion 23 arranged on a middle section thereof, the oil inflow portion 23 has a peripheral groove 230 on which a first pressure balance orifice P21 is formed. Between the oil inflow portion 23 and the first oil return portion 25 is defined a first work portion 21, and between the oil inflow portion 23 and the second oil return portion 26 is defined a second work portion 22.

Figure 7:
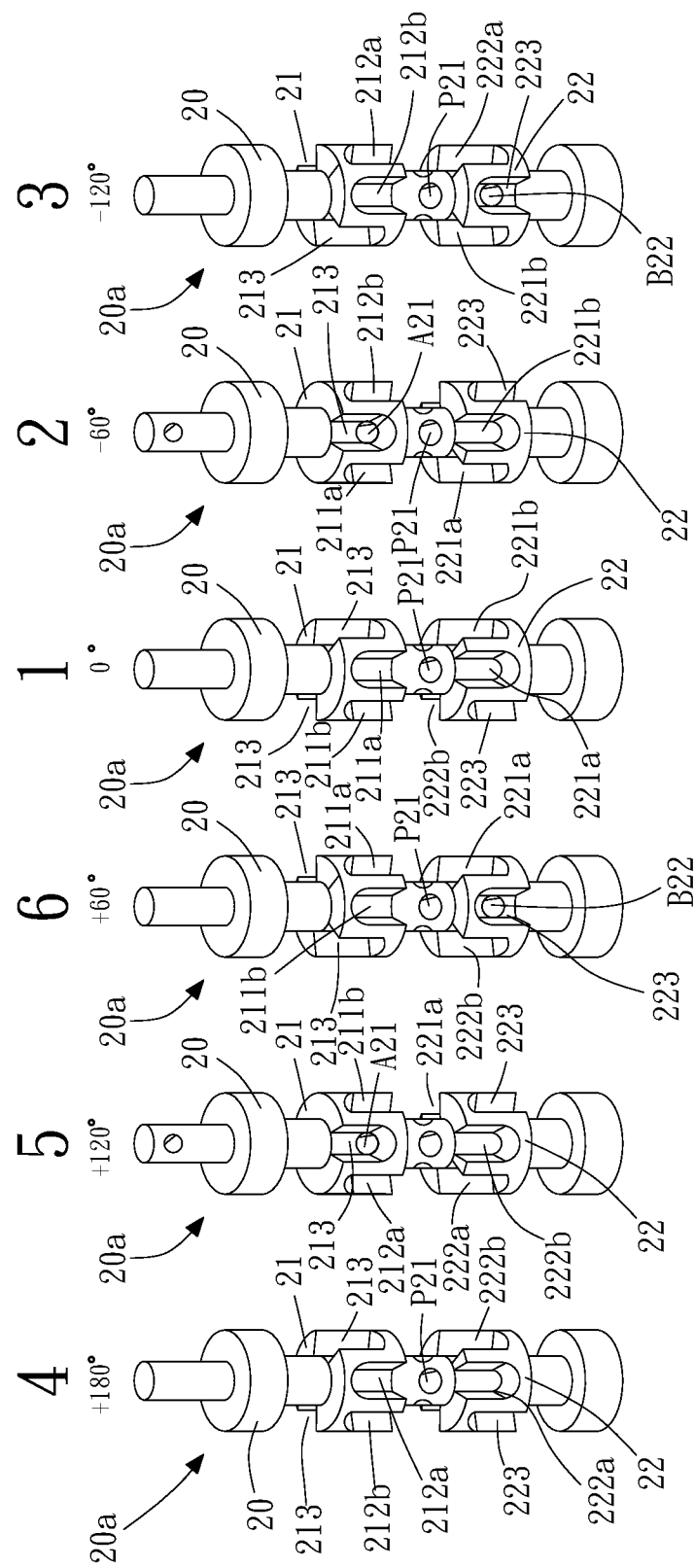
FIG. 7 shows perspective views of the assembly of the valve core of the rotary hydraulic valve at different angles according to the preferred embodiment of the present invention.
Figure 8:
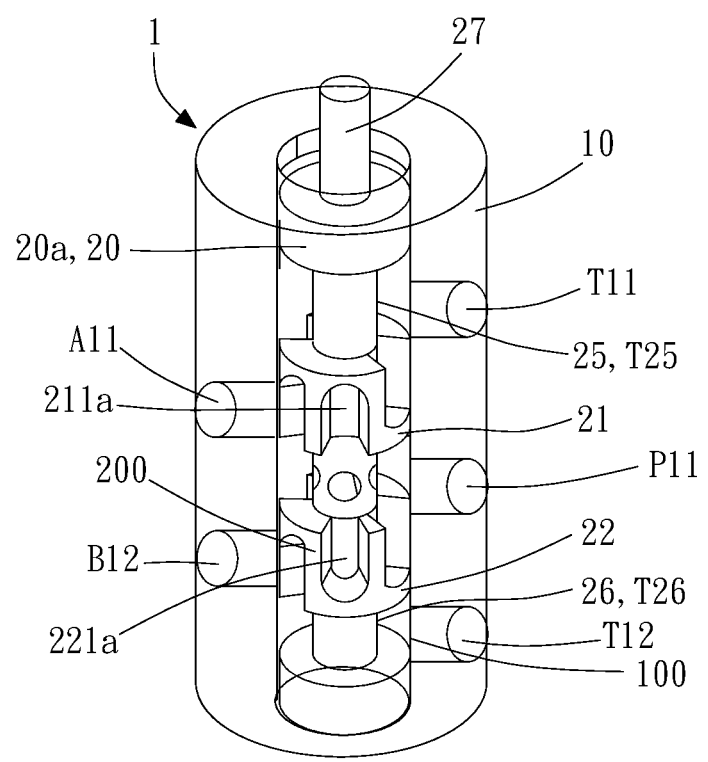
FIG. 8 is a cross-sectional perspective showing the assembly of the rotary hydraulic valve according to the preferred embodiment of the present invention.

Referring to FIG. 7, the first work portion 21 has two adjacent first troughs 211a, 211b formed on a first peripheral side thereof and has two adjacent second troughs 212a, 212b formed on a second peripheral side thereof, wherein the two first troughs 211a, 211b and the two second troughs 212a, 212b face the oil inflow portion 23 and communicate with the peripheral groove 230 of the oil inflow portion 23. The first work portion 21 has two opposite third troughs 213 arranged between the first troughs 211a, 211b and the two second troughs 212a, 212b, such that the two third troughs 213 face the first oil return portion 25 and communicate with the first trench T25 of the first oil return portion 25. The first pressure balance orifice P21 passes through the two third troughs 213 so that the two third troughs 213 communicate with each other through the first pressure balance orifice P21.

The second work portion 22 has two adjacent first grooves 221a, 221b formed on a first peripheral side thereof and has two adjacent second groves 222a, 222b formed on a second peripheral side thereof, wherein the two first grooves 221a, 221b and the two second grooves 222a, 222b face the oil inflow portion 23 and communicate with the peripheral groove 230 of the oil inflow portion 23. The second work portion 22 has two opposite third grooves 223 arranged between the first grooves 221a, 221b and the two second grooves 222a, 222b, such that the two third grooves 223 face the second oil return portion 26 and communicate with the second trench T26 of the second oil return portion 26. A second pressure balance orifice B22 passes through the two third grooves 223 so that the two third grooves 223 communicate with each other via the second pressure balance orifice B22.

The valve core 20a is rotatably connected with an inner wall of the accommodation space 100, and the axial post 20 of the valve core 20a has a driven portion 27 extending upward from a top 20 of the valve core 20a and into the accommodation space 100 of the valve body 10. The valve body 10 further includes a through orifice 101 corresponding to the driven portion 27 and includes a closing element 102 arranged around an inner wall of the through orifice 101, wherein the driven portion 27 corresponds to the through orifice 101 and extends out of the valve body 10. The driven portion 27 of the valve core 20a is manually or electrically driven by an electromagnet or a motor to rotate, such that the valve body 10 is driven by the driven portion 27 to rotate, wherein the valve core 20a rotates to at least three angles relative to the valve body 10, and a separation fringe 200 is defined between the two first troughs 211a, 211b, the two second troughs 212a, 212b, the two third troughs 213, the two first grooves 221a, 221b, the two second groves 222a, 222b, and the two third grooves 223 respectively, so as to form a closed channel to control and adjust a flowing direction and flow of hydraulic oil in each of the two first troughs 211a, 211b, the two second troughs 212a, 212b, the two third troughs 213, the two first grooves 221a, 221b, the two second groves 222a, 222b, and the two third grooves 223, thus controlling the actuator 50. Preferably, said each of the two first troughs 211a, 211b, the two second troughs 212a, 212b, the two third troughs 213, the two first grooves 221a, 221b, the two second groves 222a, 222b, and the two third grooves 223 is open and geometric. In this embodiment, said each of the two first troughs 211a, 211b, the two second troughs 212a, 212b, the two third troughs 213, the two first grooves 221a, 221b, the two second groves 222a, 222b, and the two third grooves 223 is formed in U shape or in inverted U shape.

Referring to FIGS. 8, 9A, 9B, 9C and 10, when the valve core 20a rotates to a first angle (such as 0 degree), the hydraulic oil in said each of the two first troughs 211a, 211b, the two second troughs 212a, 212b, the two third troughs 213, the two first grooves 221a, 221b, the two second groves 222a, 222b, the two third grooves 223, the first working orifice A11, the second working orifice B12, the inlet P11, the first returning orifice T11, and the second returning orifice T12 is adjusted based on using requirements so as to drive the actuator to operate.

Figure 9:
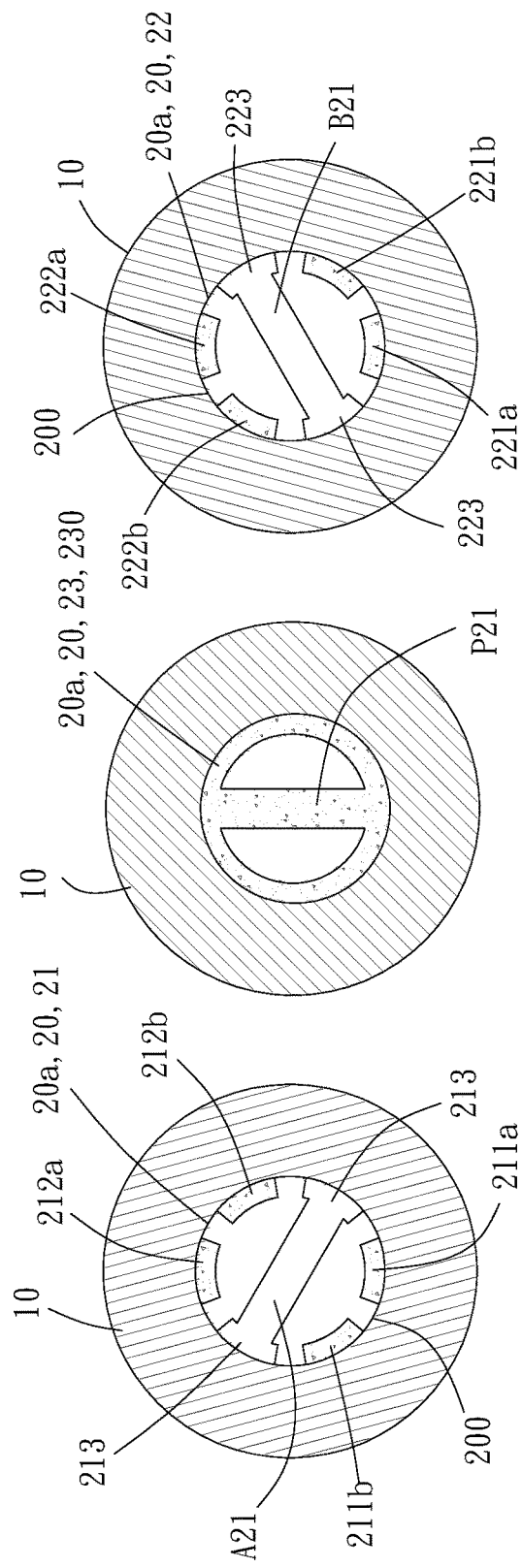
FIG. 9A is a cross sectional view showing the assembly of the rotary hydraulic valve according to the preferred embodiment of the present invention.
FIG. 9B is another cross sectional view showing the assembly of the rotary hydraulic valve according to the preferred embodiment of the present invention.
FIG. 9C is also another cross sectional view showing the assembly of the rotary hydraulic valve according to the preferred embodiment of the present invention.
Figure 10:
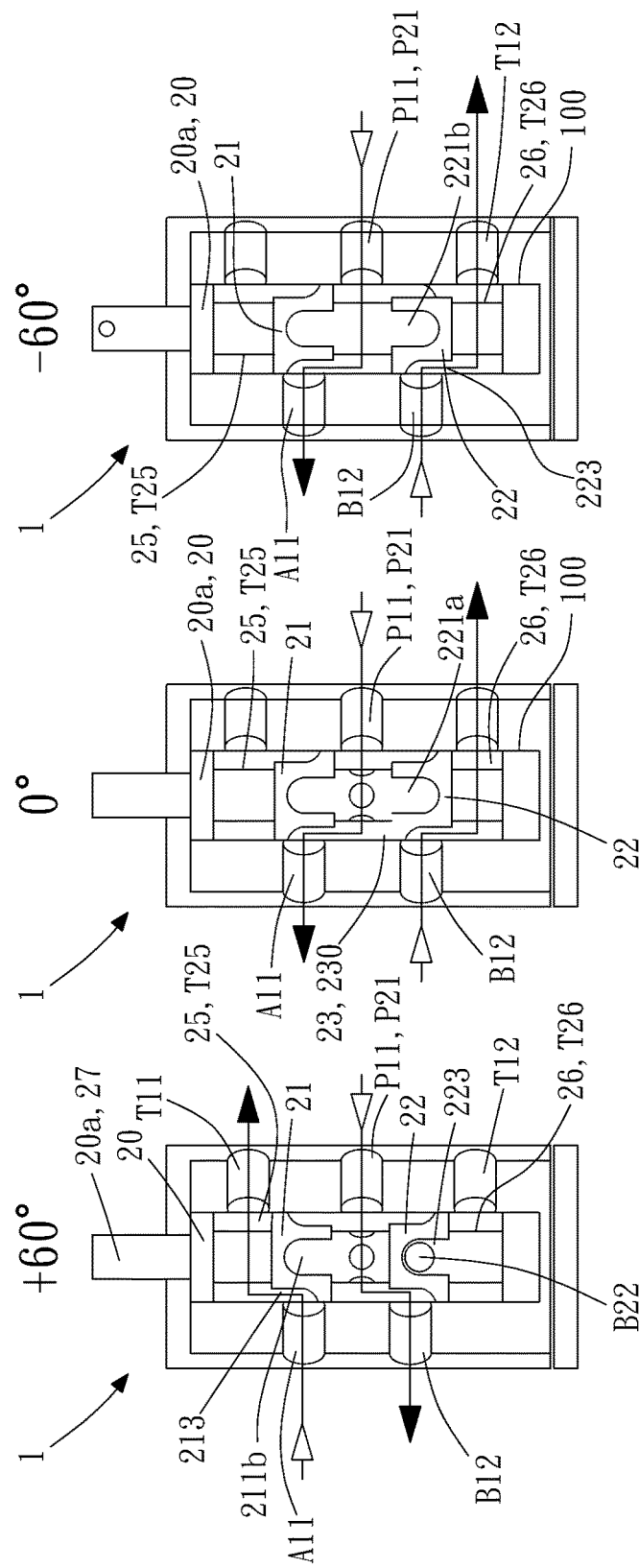
FIG. 10 shows side plan views of the operation of the rotary hydraulic valve according to the preferred embodiment of the present invention.

When the inlet P11 of the valve body 10 communicates with the peripheral groove 230 of the oil inflow portion 23, the hydraulic oil of the hydraulic source 30 flows into the peripheral groove 230 from the inlet P11, hence the peripheral groove 230 of the oil inflow portion 23 is full of the hydraulic oil (as shown in FIG. 9B), and the hydraulic oil flows into the two first troughs 211a, 211b and the two second troughs 212a, 212b (as illustrated in FIG. 9A. Also, the hydraulic oil flows into the two first grooves 221a, 221b and the two second groves 222a, 222b (as shown in FIG. 9C), hence the valve core 20a is forced evenly by the hydraulic oil to rotate smoothly.

When the valve core 20a rotates to a second angle (such as +60 degrees) relative to the valve body 10, the peripheral groove 230 of the oil inflow portion 23 communicates with the inlet P11 of the valve body 10, and the first grooves 221a, 221b and the two second grooves 222a, 222b of the second work portion 22 are in communication with the second working orifice B12 of the valve body 10 so that the hydraulic oil drives the actuator 50 to operate, and the second working orifice B12 is in communication with the first working orifice A11 by using the actuator 50, the first working orifice A11 communicates with the two third troughs 213 which communicates with the first trench T25, hence the hydraulic oil is full of the two third troughs 213 and the first trench T25, and the first trench T25 is in communication with the first returning orifice T11 of the valve body 10 so as to flow the hydraulic oil back to the hydraulic source 30.

When the valve core 20a rotates to a third angle (such as −60 degrees) relative to the valve body 10, the peripheral groove 230 of the valve core 20a communicates with the inlet P11 of the valve body 10, and the two first troughs 211a, 211b and the two second troughs 212a, 212b of the first work portion 21 communicate with the first working orifice A11 of the valve body 10 so as to drive the actuator 50 to rotate, the first working orifice A11 is in communication with the second working orifice B12 by way of the actuator 50, the second working orifice B12 communicates with the two third grooves 223 of the second work portion 22, the two third grooves 223 is in communication with the second trench T26, and the second trench T26 communicates with the second returning orifice T12 of the valve body 10 so that the hydraulic oil flows back to the hydraulic source 30.

Thereby, pressure of the hydraulic oil acts in the valve body 10 so that tightness between the valve core 20a and the valve body 10 is less than 3 um to reduce leakage of the hydraulic oil. Preferably, a pressure difference acting on the valve core 20a is quite small so as to suspend the valve core 20a in the accommodation space 100 smoothly. Furthermore, the rotary hydraulic valve 1 of the present invention is lightweight, simplified and is controlled easily.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A rotary hydraulic valve comprising:
    a valve body in which an accommodation space is defined so as to accommodate a valve core having an axial post;
    the valve body including an inlet, a first working orifice, a second working orifice, a first returning orifice, and a second returning orifice which are all in communication with an external environment and the accommodation space; wherein
    the axial post of the valve core has a first oil return portion formed on a first end thereof and has a second oil return portion arranged on a second end thereof, the first oil return portion has a first trench defined thereon, and the second oil return portion has a second trench formed thereon; the axial post also has an oil inflow portion arranged on a middle section thereof, the oil inflow portion has a peripheral groove on which a first pressure balance orifice is formed;
    between the oil inflow portion and the first oil return portion is defined a first work portion, and between the oil inflow portion and the second oil return portion is defined a second work portion;
    the first work portion has two adjacent first troughs formed on a first peripheral side thereof and facing the oil inflow portion, and the first work portion has two adjacent second troughs formed on a second peripheral side thereof and facing the oil inflow portion, wherein the two first troughs and the two second troughs communicate with the peripheral groove of the oil inflow portion;
    the first work portion further has two opposite third troughs arranged between the first troughs and the two second troughs, such that the two third troughs face the first oil return portion and communicate with the first trench of the first oil return portion, and the first pressure balance orifice passes through the two third troughs so that the two third troughs communicate with each other through the first pressure balance orifice;
    the second work portion has two adjacent first grooves formed on a first peripheral side thereof and facing the oil inflow portion, and the second work portion and has two adjacent second groves formed on a second peripheral side thereof and facing the oil inflow portion, wherein the two first grooves and the two second grooves communicate with the peripheral groove of the oil inflow portion;
    the second work portion further has two opposite third grooves arranged between the first grooves and the two second grooves, such that the two third grooves face the second oil return portion and communicate with the second trench of the second oil return portion, and a second pressure balance orifice passes through the two third grooves so that the two third grooves communicate with each other via the second pressure balance orifice;
    wherein the valve core rotates to at least three angles relative to the valve body.

2. The rotary hydraulic valve as claimed in claim 1, wherein each of the two first troughs, the two second troughs, the two third troughs, the two first grooves, the two second groves, and the two third grooves is open and geometric.

3. The rotary hydraulic valve as claimed in claim 1, wherein a separation fringe is defined between the two first troughs, the two second troughs, the two third troughs, the two first grooves, the two second groves, and the two third grooves respectively, so as to form a closed channel to control and adjust a flowing direction and flow of hydraulic oil in each of the two first troughs, the two second troughs, the two third troughs, the two first grooves, the two second groves, and the two third grooves.

4. The rotary hydraulic valve as claimed in claim 1, wherein each of the two first troughs, the two second troughs, the two third troughs, the two first grooves, the two second groves, and the two third grooves is formed in U shape or in inverted U shape.

5. The rotary hydraulic valve as claimed in claim 1, wherein the inlet, the first returning orifice, and the second returning orifice communicate with a hydraulic source.

6. The rotary hydraulic valve as claimed in claim 1, wherein the first working orifice and the second working orifice connect with an actuator, such that the first working orifice communicates with the second working orifice via the actuator.

7. The rotary hydraulic valve as claimed in claim 1, wherein when the inlet of the valve body communicates with the peripheral groove of the oil inflow portion, the hydraulic oil of the hydraulic source flows into the peripheral groove from the inlet, hence the peripheral groove of the oil inflow portion is full of the hydraulic oil, and the hydraulic oil flows into the two first troughs and the two second troughs, the hydraulic oil also flows into the two first grooves and the two second groves, hence the valve core is forced evenly by the hydraulic oil.

8. The rotary hydraulic valve as claimed in claim 1, wherein when the valve core rotates to a second angle relative to the valve body, the peripheral groove of the oil inflow portion communicates with the inlet of the valve body, and the first grooves and the two second grooves of the second work portion are in communication with the second working orifice of the valve body so that the hydraulic oil drives the actuator to operate, and the second working orifice is in communication with the first working orifice by using the actuator, the first working orifice communicates with the two third troughs which communicates with the first trench, hence the hydraulic oil is full of the two third troughs and the first trench, and the first trench is in communication with the first returning orifice of the valve body so as to flow the hydraulic oil back to the hydraulic source.

9. The rotary hydraulic valve as claimed in claim 1, wherein when the valve core rotates to a third angle relative to the valve body, the peripheral groove of the valve core communicates with the inlet of the valve body, and the two first troughs and the two second troughs of the first work portion communicate with the first working orifice of the valve body so as to drive the actuator to rotate, the first working orifice is in communication with the second working orifice by way of the actuator, the second working orifice communicates with the two third grooves of the second work portion, the two third grooves is in communication with the second trench, and the second trench communicates with the second returning orifice of the valve body so that the hydraulic oil flows back to the hydraulic source.

* * * * *